UNITED STATES PATENT OFFICE.

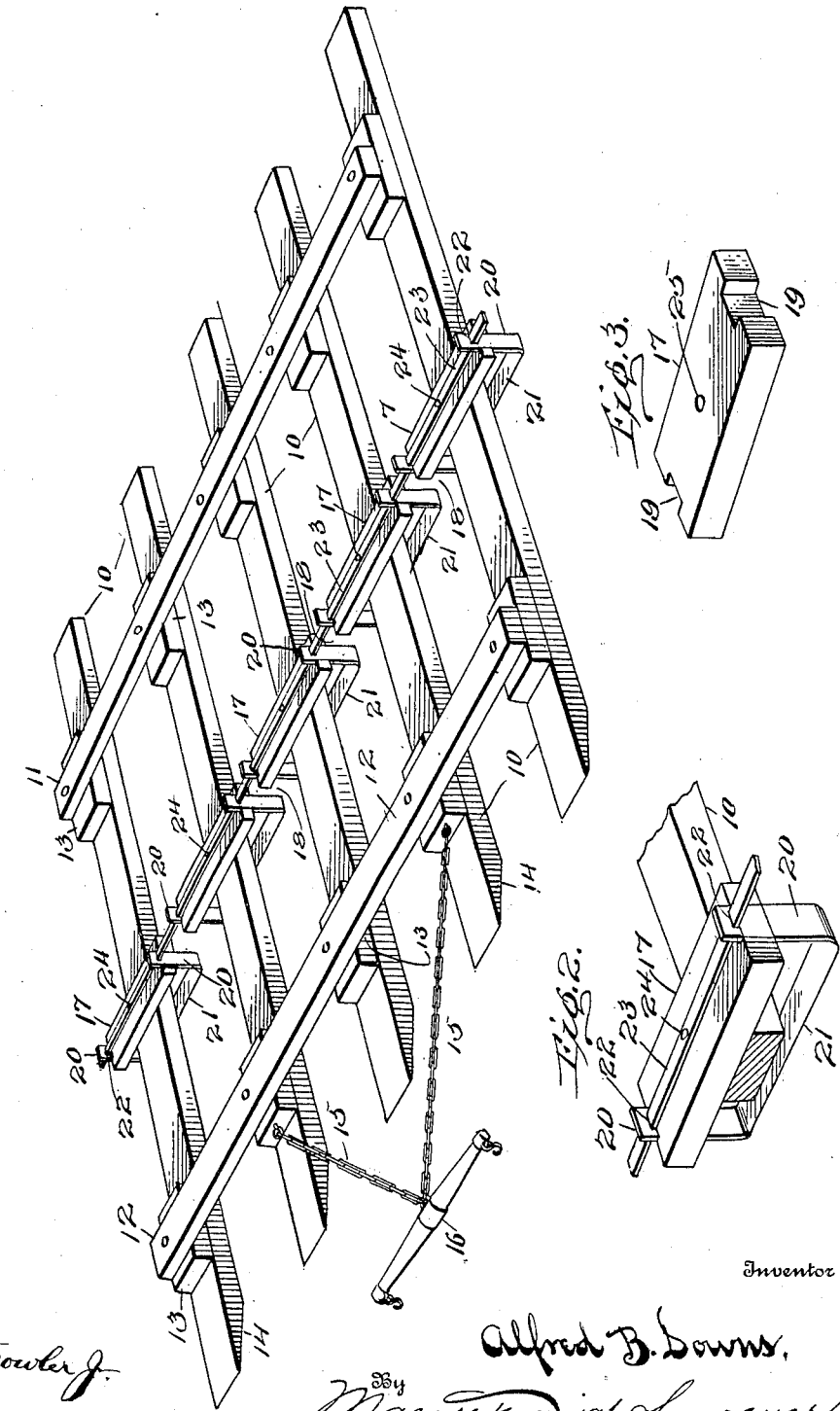

ALFRED B. DOWNS, OF MEMPHIS, TENNESSEE.

CROP-THINNER.

No. 856,685.  Specification of Letters Patent.  Patented June 11, 1907.

Application filed August 30, 1906. Serial No. 332,684.

*To all whom it may concern:*

Be it known that I, ALFRED B. DOWNS, a citizen of the United States, residing at Memphis, in the county of Shelby and State of Tennessee, have invented certain new and useful Improvements in Crop-Thinners; and I do hereby declare the following to be a full, clear, and exact description of the invention, such as will enable others skilled in the art to which it appertains to make and use the same.

This invention relates to crop thinners and has for an object to provide a device of the class embodying improved means for thinning crops standing in rows.

A further object of the invention is to provide a crop thinner adapted for thinning various crops, but particularly adapted for thinning cotton, and embodying means whereby the entire device rides upon the crest of the thrown-up rows.

A further object of the invention is to provide a crop thinner embodying improved means for facilitating the use of the device transversely of the rows of standing plants, and whereby the cutters engage the ground only at the tops of the rows.

A further object is to provide in a device of the class a plurality of runners having depending cutters secured transversely thereof intermediate their ends and spaced apart to permit the passage of uncut plants.

With these and other objects in view the invention comprises certain novel constructions, combinations and arrangements of parts as will be hereinafter fully described and claimed.

In the drawings, Figure 1 is a perspective view of the improved crop thinner. Fig. 2 is a perspective view of one of the cutters and the immediate adjacent parts. Fig. 3 is a perspective view of one of the blocks used to position the cutters.

Like characters of reference designate corresponding parts throughout the several views.

In its preferred embodiment the crop thinner forming the subject-matter of this application comprises a plurality of longitudinally extending beams or runners 10 spaced apart and secured rigidly together by means of cross-beams 11 and 12 adjacent opposite ends and with the cross-beams 11 and 12 raised above and spaced from the runners 10 in any approved manner, as by means of interposed blocks 13. The forward ends of the runners 10 are beveled as at 14 and draft is applied in any approved manner, as by means of the chains 15 and whiffle-tree 16.

Intermediate the ends of the runners 10 and of the cross-pieces 11 and 12, a block 17 is secured to each of the runners upon the upper side and extending transversely thereof toward the block upon the adjacent runner and spaced therefrom to form an interval, as at 18. The blocks 17 are each provided at opposite ends with recesses or notches 19 proportioned to receive and accommodate the upwardly-turned ends 20 of the cutter 21. The upwardly-turned ends 20 of the cutter are provided with openings 22 adjacent the extremities and registering with each other, and through which is inserted a cleat or strap 23 extending longitudinally through all of said cutters and secured in any approved manner, as by means of a bolt 24 inserted through an opening, as 25, at the middle of each of the blocks 17 and through the underlying runner 10. The up-turned ends of the cutters 21 are so proportioned that the cutter is spaced from and beneath the runner 10, which said runner is embraced between the cutter and its associated block 17. It will thus be seen that extending below each of the runners is a knife or cutter 21 spaced from the adjacent cutter, as by the interval 18, whereby when the device is drawn transversely of the rows the cutters depending below the runners engage the top or crests of the up-turned furrows or rows and cut or dig any and all standing plants at that point, while the standing plants between the said cutters pass through the intervals 18 and are not engaged by the device, as the cross-pieces 11 and 12 are raised above the runners, thereby preventing their engagement with the standing plants.

The runners, as shown, may be in any approved number and of any approved length, the length being preferably such that several rows are at all times touched and covered by the device, and whereby the entire device is carried upon the tops or crests of the furrow only, with no part at any time dropping into the hollow or valley between adjacent upturned furrows. By the employment of the device as shown, the portion of the furrow to be cut out together with the plants standing therein, are by the cutters engaged and cut and pushed from the crest of the furrows into the valley between the furrows without the device itself at any time dropping below the crests, and whereby a smooth and continuous passage upon the tops of the furrows is accomplished. It will also be seen that the knives or cutters are in engagement with the ground only at the moment of engaging the crests of the rows, and that while passing from one up-turned furrow to the next they are held by the runners out of engagement, and therefore exert no opposition to the draft.

By the employment of the strip or cleat 23, the cutters 21 may be removed conveniently at any time for replacing or for sharpening, as occasion may make expedient, and are held operatively securely in position by means of the recesses 19 formed in the opposite ends of the blocks 17.

What I claim is:—

1. In a crop thinner, a runner, a block secured transversely of the runner and provided with recesses in its opposite ends, a cutter having up-turned ends disposed within the recesses of the block and depending below the runner, and means securing the cutter within the recesses.

2. In a crop thinner, a runner, a block secured transversely upon the upper side of the runner and provided with recesses formed in its opposite ends, a cutter having up-turned ends proportioned for engagement within the recesses of the block and provided with apertures in its extremities, and a cleat extending through the apertures of the cutter and secured to the block.

3. In a crop thinner, a plurality of runners, a block secured to each runner intermediate its ends and with intervals between adjacent blocks, the said blocks being provided with recesses in their opposite ends, cutters having up-turned ends disposed within the recesses of the block and provided with apertures in their extremities, and a cleat extending in parallelism with and secured to the blocks and through the apertures of the cutters.

4. A crop thinner comprising a plurality of runners, cross-pieces spaced above and rigidly connecting the runners, blocks secured to the runners transversely intermediate their ends, and with intervals between adjacent blocks and recesses formed in opposite ends, cutters having up-turned ends embracing the runner and engaged within the recesses, and provided with apertures in their extremities, and a cleat extending through the apertures of the cutter in parallelism with the blocks and rigidly secured thereto.

In testimony whereof I affix my signature in presence of two witnesses.

ALFRED B. DOWNS.

Witnesses:
  JOHN COWAN,
  Q. L. HARRIS.